(12) United States Patent
Curtis

(10) Patent No.: US 8,162,383 B2
(45) Date of Patent: Apr. 24, 2012

(54) SELF-COILING DENT GUARD

(75) Inventor: James Curtis, Dallas, TX (US)

(73) Assignee: Ideas & Innovations, LLC, Carrollton, TX (US)

( * ) Notice: Subject to any disclaimer, the term of this patent is extended or adjusted under 35 U.S.C. 154(b) by 24 days.

(21) Appl. No.: 12/758,562

(22) Filed: Apr. 12, 2010

(65) Prior Publication Data

US 2010/0295325 A1 Nov. 25, 2010

Related U.S. Application Data

(60) Provisional application No. 61/180,013, filed on May 20, 2009.

(51) Int. Cl.
*B60J 9/00* (2006.01)

(52) U.S. Cl. .................................................. 296/180.4

(58) Field of Classification Search ............... 296/180.4, 296/187.03, 107.03; 293/128, 121, 117, 293/120, 142; 280/756, 770, 851; 428/122; 220/276; 256/1, 13.1; 404/6; 49/462; 52/716.5
See application file for complete search history.

(56) References Cited

U.S. PATENT DOCUMENTS

| | | | | |
|---|---|---|---|---|
| 3,147,176 A | * | 9/1964 | Haslam | 428/55 |
| 3,472,546 A | | 10/1969 | Samuels | |
| 3,473,836 A | * | 10/1969 | Halter | 293/107 |
| 3,659,887 A | | 5/1972 | Marquette | |
| 3,715,138 A | * | 2/1973 | Finkle | 293/1 |
| 3,884,132 A | * | 5/1975 | Snodgrass | 493/396 |
| 4,498,697 A | | 2/1985 | McGlone et al. | |
| 4,539,757 A | * | 9/1985 | Shyu | 33/561.2 |
| 4,546,022 A | * | 10/1985 | Madonia et al. | 428/31 |
| 4,828,303 A | * | 5/1989 | Soria | 293/128 |
| 4,944,361 A | * | 7/1990 | Lindgren et al. | 181/129 |
| 4,946,727 A | * | 8/1990 | Kessler | 428/99 |
| 5,188,407 A | | 2/1993 | Villaveces et al. | |
| 5,286,536 A | * | 2/1994 | Gross et al. | 428/31 |
| 5,328,731 A | * | 7/1994 | Zoller | 428/31 |
| 5,362,349 A | * | 11/1994 | Zoller | 156/242 |
| 5,364,483 A | * | 11/1994 | Zoller | 156/242 |
| 5,520,765 A | * | 5/1996 | Zoller | 296/207 |
| 5,536,540 A | * | 7/1996 | Borys et al. | 428/31 |
| 5,628,069 A | * | 5/1997 | Ebert | 2/161.1 |
| 5,786,047 A | * | 7/1998 | Tomblin | 428/31 |
| 5,989,657 A | * | 11/1999 | Wurz et al. | 293/115 |
| 6,177,155 B1 | * | 1/2001 | Kurosaki | 296/146.7 |
| 6,220,916 B1 | * | 4/2001 | Bart et al. | 446/26 |
| 7,517,001 B1 | * | 4/2009 | Goldbaum | 296/126 |
| 2002/0105197 A1 | * | 8/2002 | Unterwagner | 293/128 |
| 2003/0155389 A1 | * | 8/2003 | Swartzentruber | 224/164 |
| 2009/0026776 A1 | | 1/2009 | Simmons | |

* cited by examiner

*Primary Examiner* — Kiran B Patel

(74) *Attorney, Agent, or Firm* — David W. Carstens; Zachary W. Hilton; Carstens & Cahoon, LLP

(57) ABSTRACT

A self-coiling dent guard for protecting vehicles and other objects from damage caused by unwanted collisions is disclosed. The guard is comprised of a main body adapted to absorb the impact of colliding objects. A bistable spring strip is integrated within the main body of the guard, thus giving the guard its self-coiling properties. When not in use, a user may cause the guard to coil so as to be easily stored. A magnetic strip is attached to the length of the main body such that the guard may be removably attached to a vehicle or other object. A layer of felt covering the bottom of the guard protects the vehicle from being scratched when the guard is applied or removed.

10 Claims, 5 Drawing Sheets

SELF-COILING DENT GUARD

CROSS-REFERENCE TO RELATED APPLICATION

This application claims the benefit of U.S. Provisional Application No. 61/180,013, filed May 20, 2009, which is incorporated by reference herein.

BACKGROUND OF THE INVENTION

1. Field of the Invention

The invention relates generally to removable devices for protecting vehicles and other objects from damage resulting from unwanted contact, and more specifically to a flexible, magnetically attachable guard having an integrated bistable spring strip capable of coiling said guard for quick and easy storage.

2. Description of the Related Art

Many vehicles currently sold are not equipped with adequate protection from unwanted contact from other vehicles and objects such as often occurs in parking lots, resulting in dings and other damage to the vehicle's finish (See FIG. 1). To the extent that vehicles are equipped with guards permanently attached to the side panels of the vehicle, the guards may be positioned at a height that does not properly protect the vehicle from damage caused by certain objects. For example, a runaway shopping cart is likely to collide with a parked vehicle at a point above that of most factory installed guards. Moreover, many vehicle owners find permanently attached guards to be unsightly and thus, many vehicle manufacturers have discontinued installing such guards in new production vehicles.

Removable guards for vehicles are well known in the prior art. Removable vehicle guards disclosed in the prior art allow vehicle owners to attach a guard to a vehicle, often magnetically, at a position of their choosing. When not needed, the vehicle owner may remove the guard and store it for later use. For example, U.S. Pat. No. 4,498,697 to McGlone et al. ("McGlone"), teaches the use of a molded plastic or rubber tubing having an adhesively applied flexible magnet for removably attaching the tubing to a vehicle. One drawback of the design taught by McGlone is that the guard is difficult to store in the vehicle when not in use. The rigid structure of the guard takes up valuable trunk or seating space when stored in the vehicle.

U.S. Pat. No. 5,188,407 to Villaveces et al. ("Villaveces") teaches a guard design that improves upon the guard design taught by McGlone. Villaveces discloses a removable guard that is flexible, and therefore capable of being rolled up by the user for storage in the vehicle when not in use. However, one drawback of the guard design taught by Villaveces is that it requires a great deal of effort and time to roll up a guard that may be multiple feet in length. Many vehicle owners do not find it desirable to spend a great deal of time in rolling up a guard for storage, but rather, want to quickly store the guard. Further, vehicle owners suffering from physical disabilities may find it exceedingly difficult to roll up such guards. Therefore, a need exists for a removable vehicle guard that is capable of being quickly and easily transformed into a compact form for storage.

BRIEF SUMMARY OF THE INVENTION

Accordingly, there is provided herein, a self-coiling dent guard that, in its preferred embodiments, is capable of being quickly and easily transformed into a compact form for storage when not in use.

In one aspect of the invention, a flexible, high density foam, plastic, or other such resilient material is used to form the main body of the guard, such that the material will absorb the impact of objects that would otherwise cause damage to a vehicle to which the guard is attached. The outer portion of the main body of the guard, that is, the portion not in contact with the vehicle when attached, may be flat, rounded, or have any form suitable for its desired purpose. Further, the surface of the outer portion may be configured such that it is possible to imprint marketing logos or other text/graphics thereon. The surface may also be prepared so as to permit the adhesion of a pre-printed logo cover.

In another aspect of the invention, an arched, bistable spring strip is integrated within the main body of the guard. The strip is configured to act in a manner similar to what is commonly known as a "slap bracelet," having two stable states. The spring strip has a linear stable state and a coiled stable state. A user of the guard can straighten the guard and the integrated spring strip, causing the strip to transform into the linear stable state. The guard may be attached to a vehicle when in its linear state. After removing the guard from the vehicle, the user may initiate the transformation of the guard from its linear state into its coiled state by slightly bending a portion of the guard (and integrated strip). The potential energy stored in the strip causes the strip to coil quickly and with very little effort exerted by the user. Additionally, the strip acts to further reinforce the outer portion of the guard, thus providing additional dent protection capability.

In yet another aspect of the invention, a flexible magnetic strip is attached to the main body of the guard on the side nearest the vehicle when attached thereto. The magnetic strip is composed of a composite of magnetic materials imbedded in a flexible polymer/plastic material. The magnetic strip allows the guard to be securely attached to the outer metal surface of a vehicle or other object. The user may easily remove the guard from the vehicle when desired.

In yet another aspect of the invention, a soft material such as felt comprises a bottom layer and is attached to the main body and/or the magnetic strip such that said soft material is that portion of the guard that makes contact with the vehicle when attached thereto. The soft layer of material reduces the likelihood of the guard causing damage to the vehicle when being attached or removed.

BRIEF DESCRIPTION OF THE SEVERAL VIEWS OF THE DRAWINGS

A more complete understanding of the self-coiling magnetic dent guard of the present invention may be had by reference to the following detailed description when taken in conjunction with the accompanying drawings, wherein.

Figure 1:
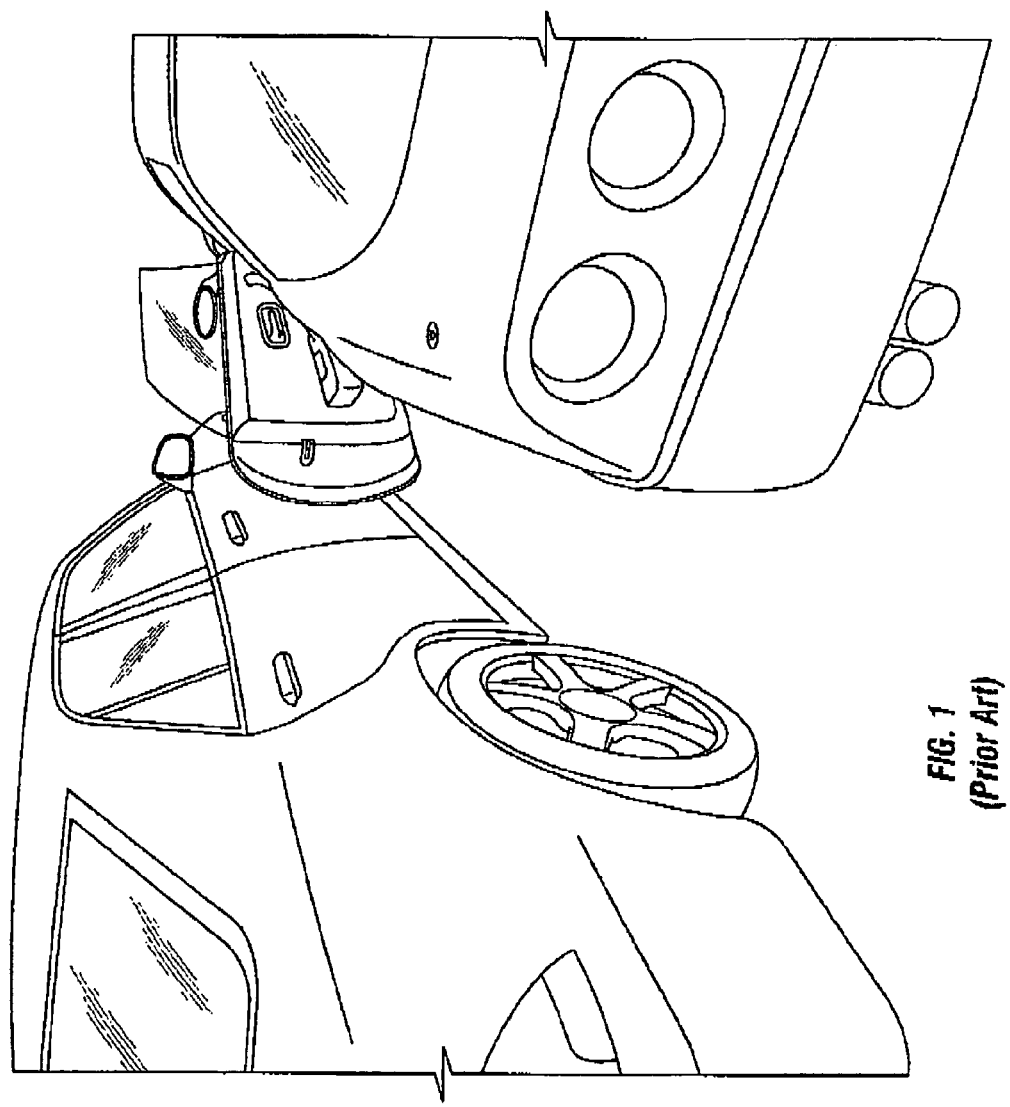
FIG. 1 is an elevated perspective view of a prior art door of a vehicle impacting the door of another vehicle that is not equipped with the present invention.

Where used in the various figures of the drawings, the same numerals designate the same or similar parts. Furthermore, when the terms "top," "bottom," "first," "second," "upper," "lower," "height," "outer," "inner," "width," "length," "end," "side," "horizontal," "vertical," and similar terms are used herein, it should be understood that these terms have reference only to the structure shown in the drawing and are utilized only to facilitate describing the invention.

All figures are drawn for ease of explanation of the basic teachings of the present invention only; the extensions of the figures with respect to number, position, relationship, and dimensions of the parts to form the preferred embodiment will be explained or will be within the skill of the art after the following teachings of the present invention have been read and understood. Further, the exact dimensions and dimensional proportions to conform to specific width, length, and similar requirements will likewise be within the skill of the art after the following teachings of the present invention have been read and understood.

Preferred embodiments of the self-coiling magnetic dent guard according to the present invention will now be described in detail with reference to the accompanying drawings.

DETAILED DESCRIPTION OF THE INVENTION

Figure 2A:
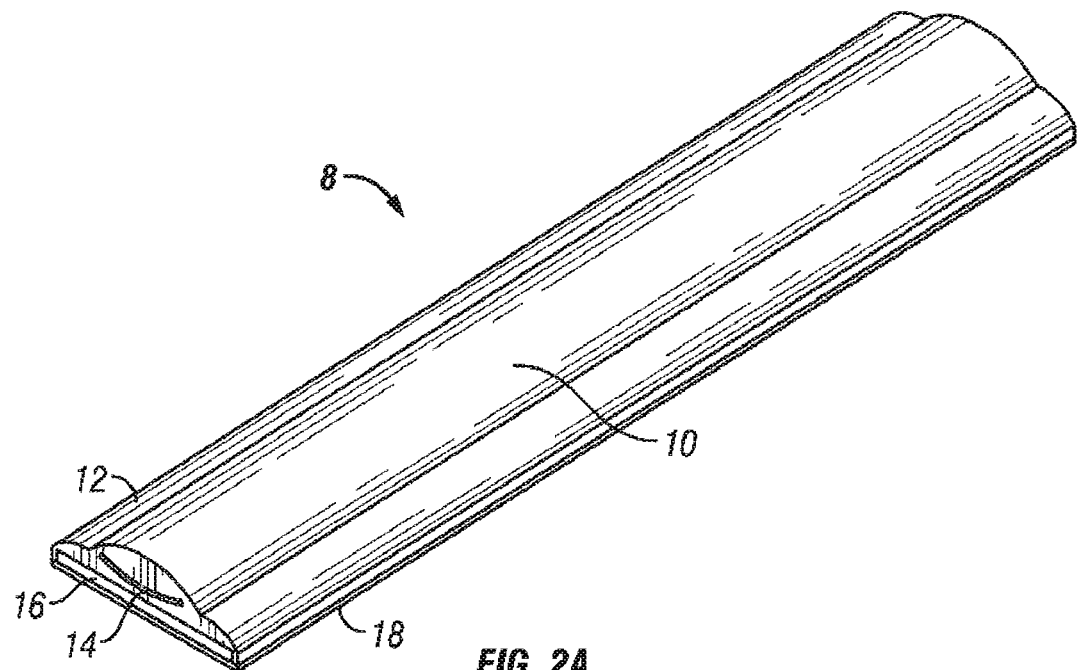
FIG. 2A is an elevated perspective view of a preferred embodiment of the guard of the present invention.

Referring to FIG. 2A, the self-coiling dent guard (hereinafter "guard") is shown from an elevated perspective view. The guard 8 of the presently preferred embodiment is generally rectangular in shape when viewed from above, having a rounded top side 10 along the length of the guard. The guard 8 takes on primarily two stable states, a linear state and a coiled state. The guard 8 as shown in FIG. 2A, is in its linear state, ready for attachment to a vehicle or other object. The guard 8 is comprised of a main body 12 strip that acts as the primary structure that resists the impact of objects colliding with the guard. Integrated within the main body 12 is a bistable spring strip 14. The spring strip 14 runs along the length of the guard 8 and functions in a manner similar to what is commonly referred to as a "slap bracelet." The bistable property of the spring strip 14 acts to give the guard 8 its linear and coiled states. A flexible magnetic strip 16, also running along the length of the guard 8, is attached to the main body 12 on the side opposite the top side (hereinafter "the bottom side"). The magnetic strip 16 allows the guard 8, when in its linear state, to be removably attached to a vehicle. A soft material such as felt, provides a bottom layer 18 that is configured to come into contact with the vehicle and thereby prevent the guard from scratching the vehicle when applying or removing the guard.

Figure 2B:
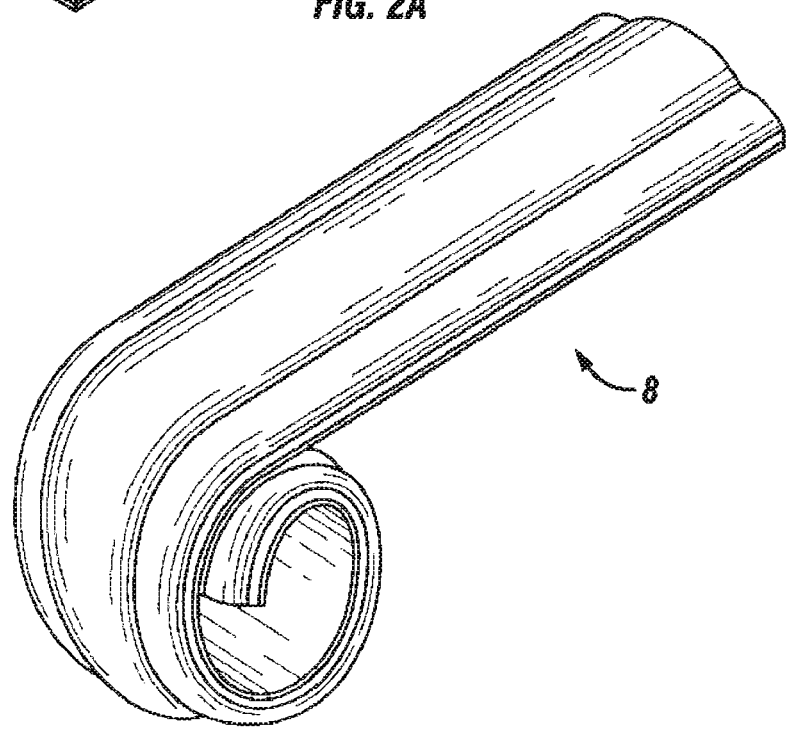
FIG. 2B is an elevated perspective view of the guard shown in FIG. 2A, as said guard transitions from it linear state to its coiled state.

Referring now to FIG. 2B, an elevated perspective view of the guard shown in FIG. 2A as said guard transitions from it linear state to its coiled state. The guard may be induced to transform from its linear state to its coiled state by the user. The user may apply a bending force to the guard along its length so as to cause the guard to bend slightly. When enough force is applied, the spring strip 14 will transition from its linear state to its coiled state, causing the flexible guard (by means of a coiling force) to coil into a form that is compact and easily stored within the vehicle.

Figure 3:
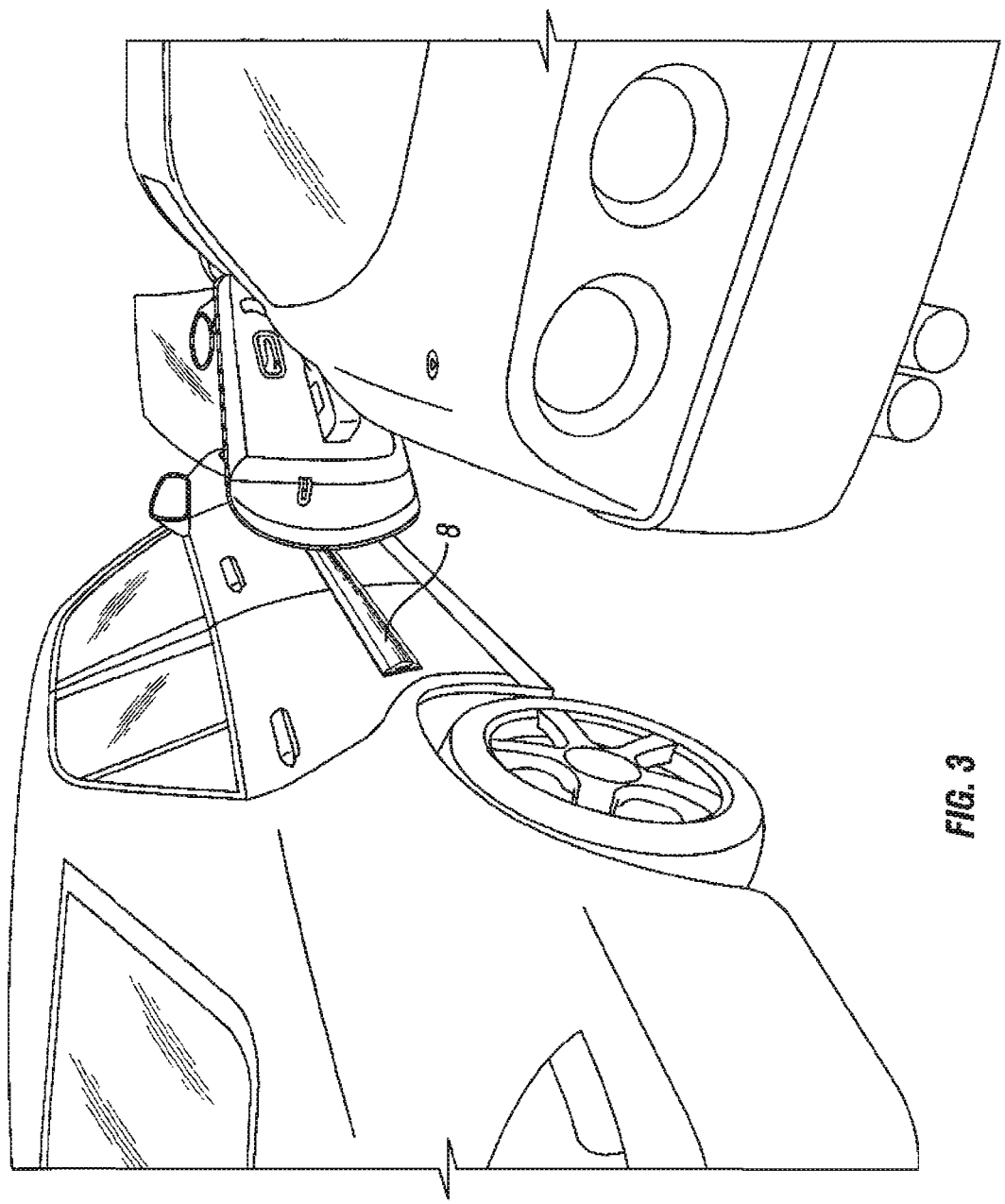
FIG. 3 is an elevated perspective view of two vehicles in which the door of one vehicle is impacting the door of anther vehicle that is equipped with the guard shown in FIG. 2A.
Figure 7:
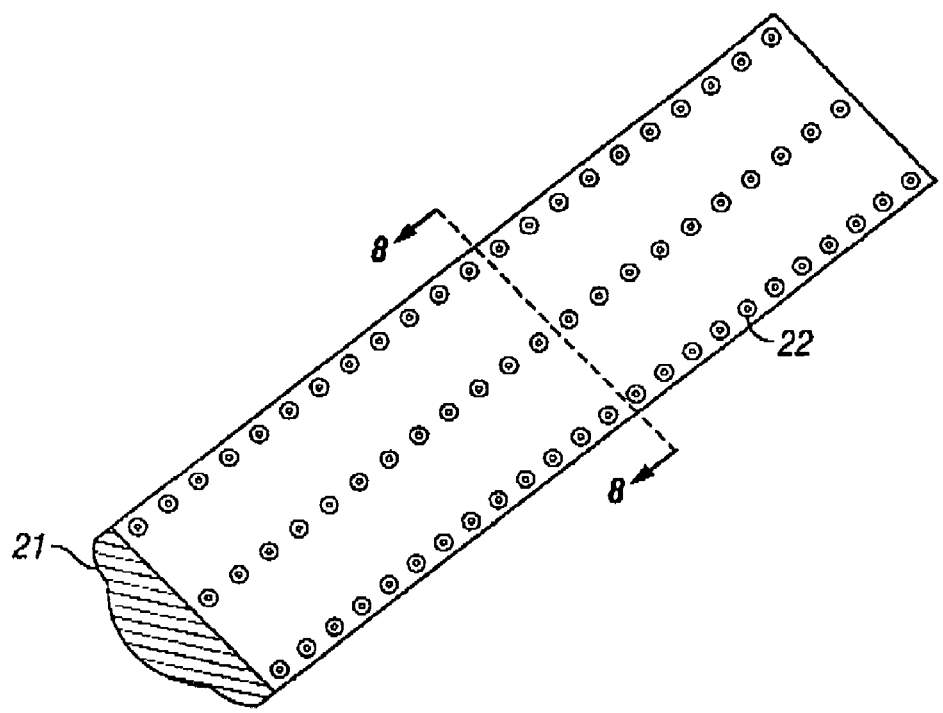
FIG. 7 is a bottom view of an alternate embodiment of the guard of the present invention, having suction devices for removably attaching said guard to an object.
Figure 8:
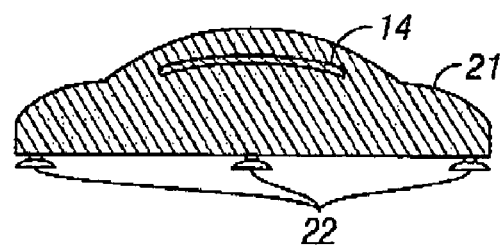
FIG. 8 is a cross sectional view of the alternate embodiment of the guard shown in FIG. 7.

Referring now to FIG. 3, an elevated view of two vehicles in which the door of one vehicle is impacting the door of another vehicle that is equipped with the guard shown in FIG. 2A. A user of the present invention may attach the guard 8 along the surface of a vehicle at any point in which the user anticipates the risk of unwanted contact. The top side 10 of the main body 12 is adapted to absorb the impact of another object contacting the guard. Although the presently preferred embodiment of the guard is described herein as useful for protecting vehicles, it should be recognized by persons of ordinary skill in the art that the guard may be used to protect any number of other objects to which the guard is capable of being attached. Moreover, while the presently preferred embodiment includes a means for removably attaching the guard to a vehicle by incorporating a magnetic strip, other means that would permit the guard to be removably attached to an object are contemplated. By way of example, and not of limitation, alternate embodiments, illustrative bottom and cross-sectional views of which are shown in FIGS. 7 and 8, respectively, may include a means for removably attaching the guard to an object, such as a boat, by use of suction devices (such as suction cups) that are configured to removably attach to substantially flat surfaces.

Figure 4:
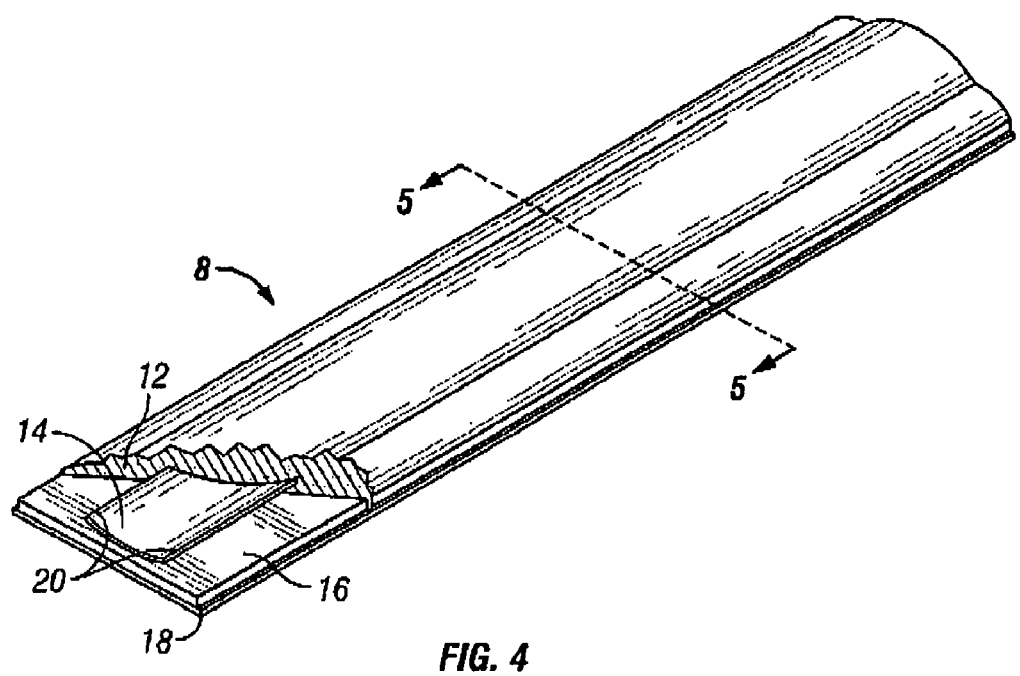
FIG. 4 is an elevated perspective view showing a portion of the main body of the guard of the present invention "cut away" to reveal the bistable spring strip and the magnetic strip.

Referring now to FIG. 4, an elevated perspective view of the guard 8 showing a portion of the main body 12 of the guard 8 of the present invention "cut away" to reveal the spring strip 14 and the magnetic strip 16. The main body of the guard, in the presently preferred embodiment, is constructed of high density polyethylene foam. However, other resilient, yet similarly flexible materials, may be used to construct the main body of the guard. The spring strip 14 is embedded within the main body 12 and runs along the length thereof. However, it is contemplated that alternate embodiments of the invention will include one or more embedded spring strips that do not run along the entire length of the main body, but only along a length that is necessary to provide the coiling function for which the strips are primarily utilized.

The spring strip 14 of the presently preferred embodiment consists of a thin steel strip having properties of a bistable spring. It should be noted that alternate embodiments of the guard may include a spring strip made of a material other than steel, such as plastic. The spring strip 14, in its linear stable state, is arched such that the lengthwise edges 20 of the spring strip are bent towards the top side of the guard 8. The bistable properties of the spring strip 14 provide the necessary force to coil the guard when so induced. In its linear state, the spring strip also provides additional protection from impacts to the guard.

Still referring to FIG. 4, the magnetic strip 16 is attached to the bottom side of the main body. The magnetic strip 16 is flexible and is comprised of a composite of magnetic materials imbedded in a polymer/plastic material. However, it is contemplated that alternate embodiments of the magnetic strip may be constructed of other suitable magnetic materials if the use of such magnetic materials does not interfere with the ability of the guard to be transformed into a compact form. It is contemplated that any flexible strip having magnetic properties may be utilized. While the magnetic strip 16 of the presently preferred embodiment runs along the entire length of the guard, alternate embodiments may be constructed such that the magnetic strip does not run along the entire length of the guard, but rather only a portion thereof. Moreover, other alternate embodiments of the guard may include multiple magnetic strips or magnets placed along the length of the guard. As mentioned above, a magnetic strip is not an essential element of the present invention, but rather, it is essential that the guard include some means for removably attaching the guard to an object.

Figure 5:
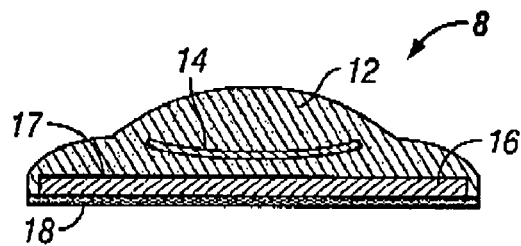
FIG. 5 is a cross sectional view of the guard shown in FIG. 4.

Referring now to FIG. 5, a cross-sectional view of the guard shown at FIG. 4. The main body 12, spring strip 14, and magnetic strip 16 are clearly visible. The arched nature of the spring strip 14 in its linear stable state is shown. A soft bottom layer 18, constructed of felt in the presently preferred embodiment, is shown as attached to the bottom side of the main body 12 and the magnetic strip 16. A channel 17 is formed under the bottom of the main body 12 to receive the magnetic strip 16. The soft bottom layer 20 protects the surface of the vehicle from damage that may otherwise be caused when the guard contacts the vehicle. It should be noted that those skilled in the prior art will recognize that any number of soft materials other than felt may be utilized to construct the bottom layer in alternate embodiments of the present invention. Further, the bottom layer is not essential to the present invention in that it may be found that the magnetic strip chosen is sufficiently soft so as to not cause damage to the vehicle when in contact.

Figure 6:
FIG. 6 is a perspective view of an alternate embodiment of the present invention having an outer surface of the main body of the guard prepared for the placement of a logo.

Referring now to FIG. 6, a perspective view of an alternate embodiment of the present invention, having an outer surface of the main body 12 of the guard 8 prepared for the placement of a logo. The surface of the top side 10 of the main body 12, in alternate embodiments, may be prepared so as to apply or print text and/or graphics thereon. Further alternate embodiments may include a transparent sleeve (not shown) in which to insert text and/or graphics. The foregoing capability provides an advantage over other prior art guards in that the guard may be used for marketing purposes of the user or of business interests that wish to sell or give the guard to others.

It should be noted that alternate embodiments of the present invention may have various lengths and widths. Further, alternate embodiments of the guard may be initially manufactured in greater lengths than would be desirable to apply to a vehicle. However, such lengthy guards may be cut into a length that is desired by a user or a business seeking to distribute the guards. Sheers may be optionally supplied with the guards for cutting said guards to a desired length. Additionally, a storage pouch (not shown) may be optionally supplied with the guard for easy storage.

It will now be evident to those skilled in the art that there has been described herein, a self-coiling dent guard that is easily transformed into a compact form for storage. Although the invention hereof has been described by way of a preferred embodiment, it will be evident that other adaptations and modifications can be employed without departing from the spirit and scope thereof. The terms and expressions employed herein have been used as terms of description and not of limitation; and thus, there is no intent of excluding equivalents, but on the contrary it is intended to cover any and all equivalents that may be employed without departing from the spirit and scope of the invention.

I claim:

1. A removable guard comprising:
   an elongated flexible and resilient main body strip having a length;
   a bistable spring strip embedded within said main body strip along at least a portion of said length, said bistable spring strip having two stable states including a first linear state and a second coiled state; and
   a means for removably attaching said guard to another object, said means being attached to said main body strip,
   wherein said bistable spring strip supports said guard in substantially straight position when in said first linear state and causes said main body strip to coil when induced into said second coiled state.

2. The removable guard of claim 1 wherein said means for removably attaching said guard to another object is a flexible strip having magnetic properties that is attached to a bottom side of said main body strip.

3. The removable guard of claim 2 wherein said flexible strip having magnetic properties is composed of a composite of magnetic materials imbedded in a flexible polymer material.

4. The removable guard of claim 1 wherein said means for removably attaching said guard to another object is one or more suction cups attached to a bottom side of said main body strip.

5. The removable guard of claim 2 wherein said main body strip is composed at least partially of high-density polyethylene foam.

6. The removable guard of claim 5 wherein a channel is formed under a bottom side of said main body strip that is adapted to receive said flexible strip having magnetic properties.

7. The removable guard of claim 6, further comprising a soft bottom layer attached to said flexible strip having magnetic properties.

8. The removable guard of claim 7 wherein said soft bottom layer is composed at least partially of felt.

9. The removable guard of claim 1, further comprising a transparent sleeve attached to a top side of said main body strip, said sleeve being adapted to receive printed materials.

10. The removable guard of claim 1 wherein at least a portion of a surface of a top side of said main body strip is prepared for the application of printed graphics.

* * * * *

UNITED STATES PATENT AND TRADEMARK OFFICE
CERTIFICATE OF CORRECTION

| | | |
|---|---|---|
| PATENT NO. | : 8,162,383 B2 | Page 1 of 1 |
| APPLICATION NO. | : 12/758562 | |
| DATED | : April 24, 2012 | |
| INVENTOR(S) | : James Curtis | |

It is certified that error appears in the above-identified patent and that said Letters Patent is hereby corrected as shown below:

In the Specification:
Column 2, line 58, please delete "it" and insert --its--.
Column 3, line 62, please delete "it" and insert --its--.

Signed and Sealed this
Eighth Day of January, 2013

David J. Kappos
*Director of the United States Patent and Trademark Office*